UNITED STATES PATENT OFFICE.

JOHN R. GLADNEY, OF BUENA VISTA, MISSISSIPPI.

PROCESS FOR MANUFACTURING ALCOHOLIC SPIRITS.

SPECIFICATION forming part of Letters Patent No. 224,419, dated February 10, 1880.

Application filed May 26, 1879.

*To all whom it may concern:*

Be it known that I, JOHN R. GLADNEY, of Buena Vista, in the county of Chickasaw, and in the State of Mississippi, have discovered a new Substance for Making Alcohol; and I do hereby declare that the following is a full, clear, and exact description thereof.

My invention relates to a new and improved process of manufacturing alcoholic spirits, such as brandy, whisky, rum, high-wines, &c.; and it consists in shortening the usual fermenting process, whereby the cost of production is lessened, time saved, and a much greater percentage of alcoholic spirits obtained.

This result I am enabled to obtain by the use of the plant known as "California beer-seed" as the immediate agent for generating a rapid fermentation. By thus hastening the fermenting process I am enabled to save a large percentage of alcohol which otherwise, under the ordinary protracted process of fermentation, would have passed from the vinous to the acetous fermentation, besides a large percentage of that lost by evaporation.

In making alcohol by this process I take, say, at the rate of about ten grains of the California beer-seed and place it in a suitable vessel, and then add about half a tea-spoonful of molasses or similar saccharine material, or other material containing saccharine matter, and half a pint of water of suitable temperature—say 70° to 80° Fahrenheit.

The above forms a suitable formula for an experimental or laboratory test of the process. In the practical manufacture of alcohol by this process, however, I take six hundred gallons of a saccharine solution containing from eight to fifteen per cent. of solid saccharine matter, and warm it to a temperature of, say, about 80°, and then add to it from four to six bushels of the California beer-seed. Fermentation immediately commences, but is not visible for about ten or fifteen minutes. In about six or ten hours the process of fermentation will be completed. The liquid is then poured off and alcoholic spirits produced therefrom by distillation in any of the known and usual ways.

The substance, California beer-seed, will, during the process of fermentation, have grown or increased in quantity, and can be used over and over again.

I do not confine myself to the exact proportions mentioned, as they may be varied under different circumstances; nor do I limit myself to ten hours as the extreme limit in time of the fermenting process, as that is governed largely by the season and the temperature of the atmosphere. Under favorable conditions the fermentation will have been completed in from six to ten hours, while under unfavorable circumstances it may be prolonged for several hours more.

Having thus fully described my invention, what I claim as new, and desire to secure by Letters Patent, is—

The process herein described of manufacturing alcoholic spirits, consisting, first, in making a saccharine solution; secondly, in mixing therewith, at a suitable temperature, California beer-seed for generating a rapid vinous fermentation; and, thirdly, distilling the fermented liquid thus produced in the usual or any known way, all substantially as set forth.

In testimony that I claim the foregoing I have hereunto set my hand this 19th day of May, 1879.

JOHN R. GLADNEY.

Witnesses:
C. L. EVERT,
H. J. ENNIS.